(12) United States Patent
Keil et al.

(10) Patent No.: US 10,424,998 B2
(45) Date of Patent: Sep. 24, 2019

(54) ROTOR AND MOTOR, POWER TOOL COMPRISING THE ROTOR

(71) Applicant: JOHNSON ELECTRIC INTERNATIONAL AG, Murten (CH)

(72) Inventors: Ronny Keil, Shenzhen (CN); Kwong Yip Poon, Hong Kong (CN); Bhoopal Ponnuvelu, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 240 days.

(21) Appl. No.: 15/613,870

(22) Filed: Jun. 5, 2017

(65) Prior Publication Data

US 2017/0353093 A1 Dec. 7, 2017

(30) Foreign Application Priority Data

Jun. 6, 2016 (CN) .......................... 2016 1 0394187

(51) Int. Cl.
*H02K 23/40* (2006.01)
*H02K 23/04* (2006.01)
*H02K 37/14* (2006.01)
*H02K 1/27* (2006.01)

(52) U.S. Cl.
CPC .......... *H02K 23/40* (2013.01); *H02K 1/2786* (2013.01); *H02K 23/04* (2013.01); *H02K 37/14* (2013.01)

(58) Field of Classification Search
CPC ...... H02K 23/40; H02K 1/2786; H02K 23/04; H02K 37/14
See application file for complete search history.

(56) References Cited

U.S. PATENT DOCUMENTS

| | | | | |
|---|---|---|---|---|
| 2,971,107 A * | 2/1961 | Jin | ........................... | H02K 1/17 310/239 |
| 3,468,019 A * | 9/1969 | McDermott | ........... | H02K 3/487 29/596 |
| 4,745,319 A * | 5/1988 | Tomite | ..................... | H02K 1/17 310/154.15 |
| 4,918,830 A * | 4/1990 | Aso | .......................... | H02K 1/17 29/596 |
| 5,920,139 A * | 7/1999 | Fujiwara | .................. | B62M 6/60 310/154.11 |
| 5,973,432 A * | 10/1999 | Katagiri | .................... | H02K 1/24 29/596 |
| 6,225,723 B1 * | 5/2001 | Cooper | .................... | H02K 1/24 310/214 |
| 6,226,857 B1 * | 5/2001 | Becherucci | .............. | H02K 7/04 29/564.6 |
| 7,911,104 B2 * | 3/2011 | Ifrim | .................... | H02K 1/2773 310/156.19 |

(Continued)

*Primary Examiner* — Robert W Horn
(74) *Attorney, Agent, or Firm* — Muncy, Geissler, Olds & Lowe, P.C.

(57) ABSTRACT

A rotor includes a magnet yoke and a number of permanent magnets. The magnet yoke defines a number of accommodating slots therein, and each of the permanent magnets is received in one of the accommodating slots. An elastic member protrudes from the magnet yoke towards each of the accommodating slots, the permanent magnets are inserted in the corresponding accommodating slots, and the elastic members are bent and abut against the permanent magnets. A motor and a power tool include the rotor are also disclosed.

20 Claims, 11 Drawing Sheets

(56) References Cited

U.S. PATENT DOCUMENTS

| | | | | |
|---|---|---|---|---|
| 8,232,702 B2* | 7/2012 | Zywot | ................... | H02K 3/527 |
| | | | | 310/214 |
| 9,000,645 B2* | 4/2015 | Onishi | .................... | H02K 1/17 |
| | | | | 310/154.01 |
| 9,543,795 B2* | 1/2017 | De Filippis | .......... | H02K 1/2773 |
| 9,735,642 B2* | 8/2017 | Bulatow | ................ | H02K 1/265 |
| 2017/0353093 A1* | 12/2017 | Keil | ....................... | H02K 23/04 |

* cited by examiner

ROTOR AND MOTOR, POWER TOOL COMPRISING THE ROTOR

CROSS REFERENCE TO RELATED APPLICATIONS

This non-provisional patent application claims priority under 35 U.S.C. § 119(a) from Patent Application No.201610394187.7 filed in The People's Republic of China on Jun. 6, 2016.

FIELD OF THE INVENTION

The present disclosure relates to the field of motors, and in particular to a rotor of a motor, and a motor and a power tool including the rotor.

BACKGROUND OF THE INVENTION

A motor such as a permanent magnet motor includes a stator and a permanent magnet rotor. The permanent magnet rotor includes a permanent magnet and a magnet yoke. The magnet yoke is generally formed by stacking a plurality of laminations. Usually, the laminations are substantially circular sheets formed by stamping silicon steel sheets. There are mainly two types of permanent magnet rotors. One is an embedded type, i.e. the permanent magnet is embedded in the magnet yoke. The other is a surface mounted type, i.e. the permanent magnet is mounted to a surface of the magnet yoke. For the permanent magnet rotor of the embedded type, a gap between the permanent magnet and the magnet yoke is existed. The permanent magnet is usually fixed to the magnet yoke via adhesive, which is injected to the gap. However, this way makes a manufacturing of the rotor complicated.

SUMMARY OF THE INVENTION

Accordingly, there is a desire for a rotor which can fix the permanent magnet to the magnet yoke and which is easy to manufacture, and a motor including the rotor.

In one aspect, a rotor is provided which includes a magnet yoke and a plurality of permanent magnets. The magnet yoke defines a plurality of accommodating slots therein, and each of the permanent magnets is received in one of the accommodating slots. An elastic member protrudes from the magnet yoke towards each of the accommodating slots, the permanent magnets are inserted in the corresponding accommodating slots, and the elastic member are bent and abut against each of the permanent magnets.

Preferably, one side of each of the permanent magnets abuts against the elastic member, and the other side of each of the permanent magnets is in contact with a side surface of the accommodating slot.

Preferably, each of the permanent magnets is in line contact with the corresponding elastic member.

Preferably, at least two elastic members are disposed in each of the accommodating slots, and the at least two elastic members are disposed in a middle portion of the magnet yoke and spaced from each other.

Preferably, the magnet yoke comprises a first lamination layer, a second lamination layer and a third lamination layer, the second lamination layer is located between the first lamination layer and the third lamination layer, the accommodating slots extend through the first lamination layer, the second lamination layer and the third lamination layer, a groove is defined through each of the second lamination layer and the third lamination layer at one side of each of the accommodating slots, the grooves in the second lamination layer and the third lamination layer are located at same sides of the corresponding accommodating slots, the elastic members protrude from the grooves of the second lamination layer towards the accommodating slots.

Preferably, the elastic member protrudes towards accommodating slot from one side of the groove of the second lamination layer, and a distal end of the elastic member bend toward the groove of the third lamination layers.

Preferably, a width of each of the elastic members is 30% to 80% of a length of each of the accommodating slots.

Preferably, a width of each of the accommodating slots is greater than a width of each of the permanent magnets, and a thickness of the third lamination layer is greater than a thickness of the second lamination layer.

Preferably, the magnet yoke further comprises two fourth lamination layers, the two fourth lamination layers are located at two ends of the magnet yoke for sealing the permanent magnets in the accommodating slots.

Preferably, the rotor further comprises a plurality of fixing pins, and the first lamination layer, the second lamination layer and the third lamination layer are fixed together by the fixing pins.

Preferably, the rotor further comprises an endcap, the endcap has a bottom wall and a sidewall, and the sidewall of the endcap is connected to the magnet yoke by the fixing pins.

Preferably, each two adjacent accommodating slots are arranged in a V-shape opened towards a center of the magnet yoke, and the each two adjacent accommodating slots that are arranged in the V-shape are in communication with each other.

In another aspect, a motor is provided which includes the rotor described above and a stator. The stator comprises a stator core and a plurality of stator windings wound around the stator core, the stator core being received in the magnet yoke.

In still another aspect, a power tool is provided which includes the permanent magnet motor described above.

Preferably, the power tool is an electric saw which comprises a saw blade, and the motor is configured to drive the saw blade.

In the rotor of the embodiment of the present disclosure, each permanent magnet is inserted into one corresponding accommodating slot and abuts against the corresponding elastic members in the accommodating slot. As a result, the permanent magnet is fixed in the accommodating slot by the elastic force of the elastic members without using adhesive to fix the permanent magnet relative to the magnet yoke, thereby facilitating manufacturing of the rotor and improving manufacturing efficiency of the motor and power tool.

DETAILED DESCRIPTION OF THE PREFERRED EMBODIMENTS

The technical solutions of the embodiments of the present disclosure will be clearly and completely described as follows with reference to the accompanying drawings. Apparently, the embodiments as described below are merely part of, rather than all, embodiments of the present disclosure. Based on the embodiments of the present disclosure, any other embodiment obtained by a person skilled in the art without paying any creative effort shall fall within the protection scope of the present disclosure.

It is noted that, when a component is described to be "fixed" to another component, it can be directly fixed to the another component or there may be an intermediate component. When a component is described to be "connected" to another component, it can be directly connected to the another component or there may be an intermediate component. When a component is described to be "disposed" on another component, it can be directly disposed on the another component or there may be an intermediate component.

Unless otherwise specified, all technical and scientific terms have the ordinary meaning as commonly understood by people skilled in the art. The terms used in this disclosure are illustrative rather than limiting. The term "and/or" used in this disclosure means that each and every combination of one or more associated items listed are included.

Figure 1:
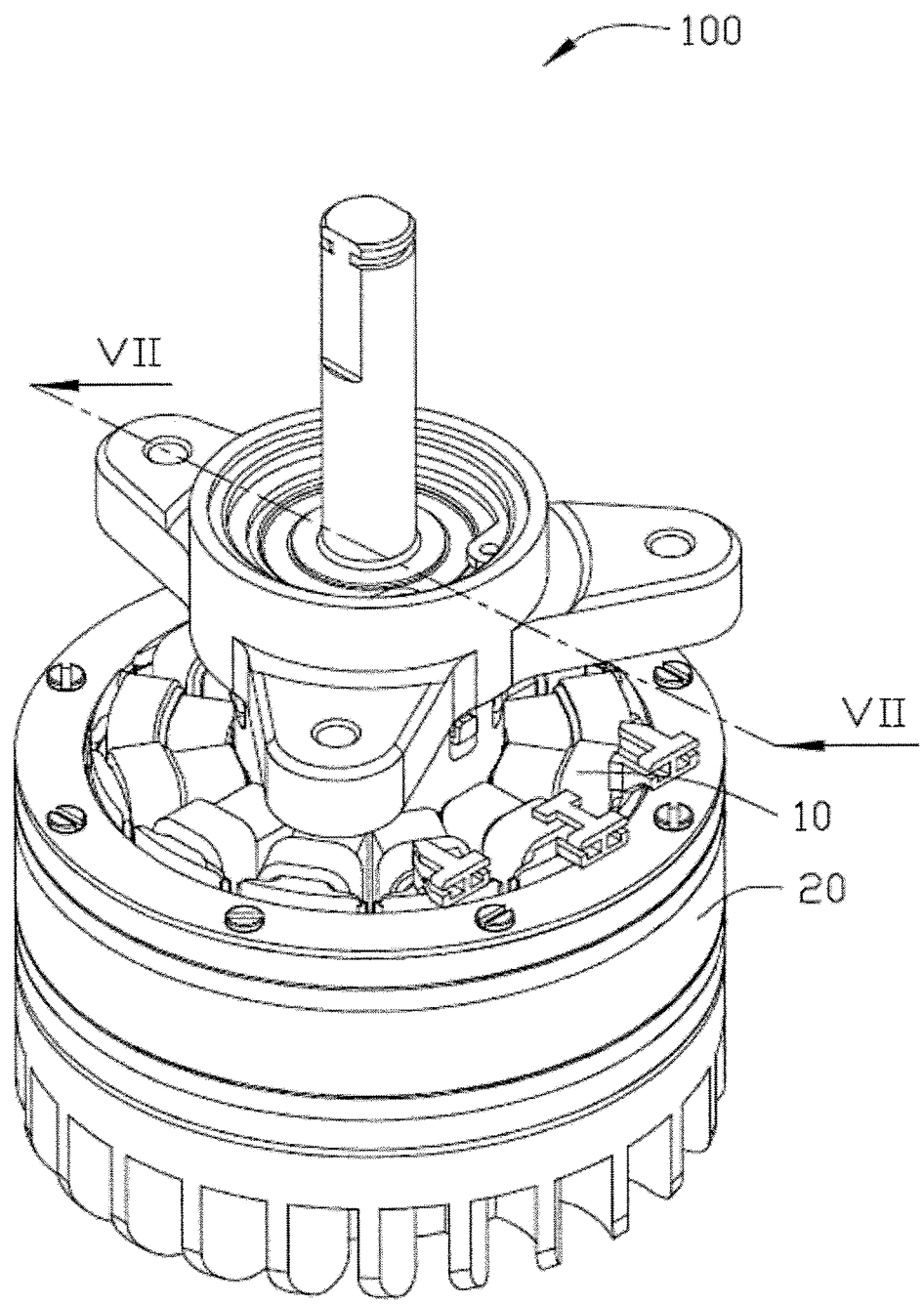
FIG. 1 is a perspective view of a motor according to one embodiment of the present disclosure.
Figure 2:
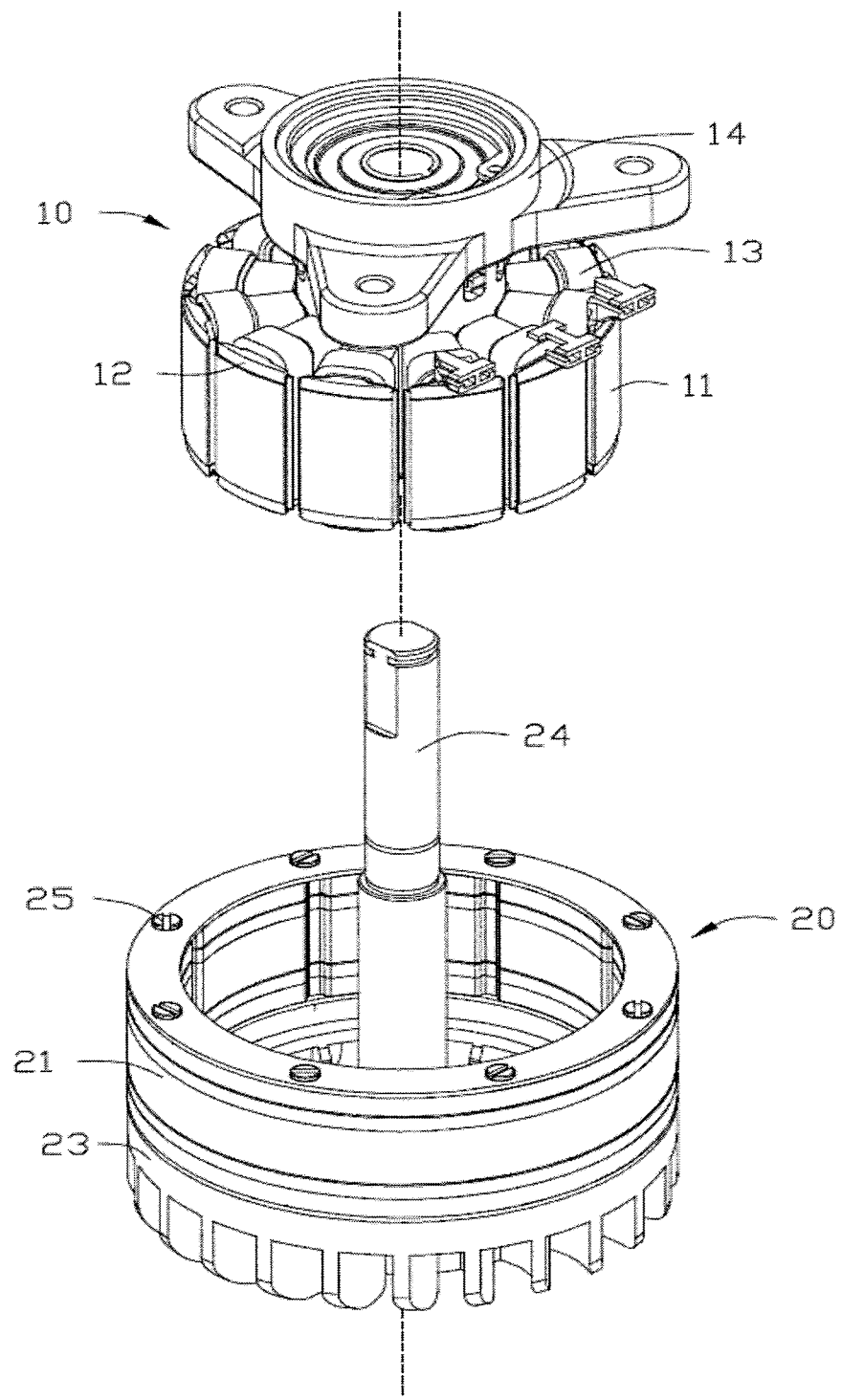
FIG. 2 is a perspective view of a stator and a rotor of the motor shown in FIG. 1.

Referring to FIG. 1 and FIG. 2, a motor 100 of one embodiment of the present disclosure includes a stator 10 and a rotor 20. The stator 10 is received in the rotor 20 and capable of rotating relative to the stator 10. In this embodiment, the motor 100 is an outer-rotor permanent magnet motor.

Figure 3:
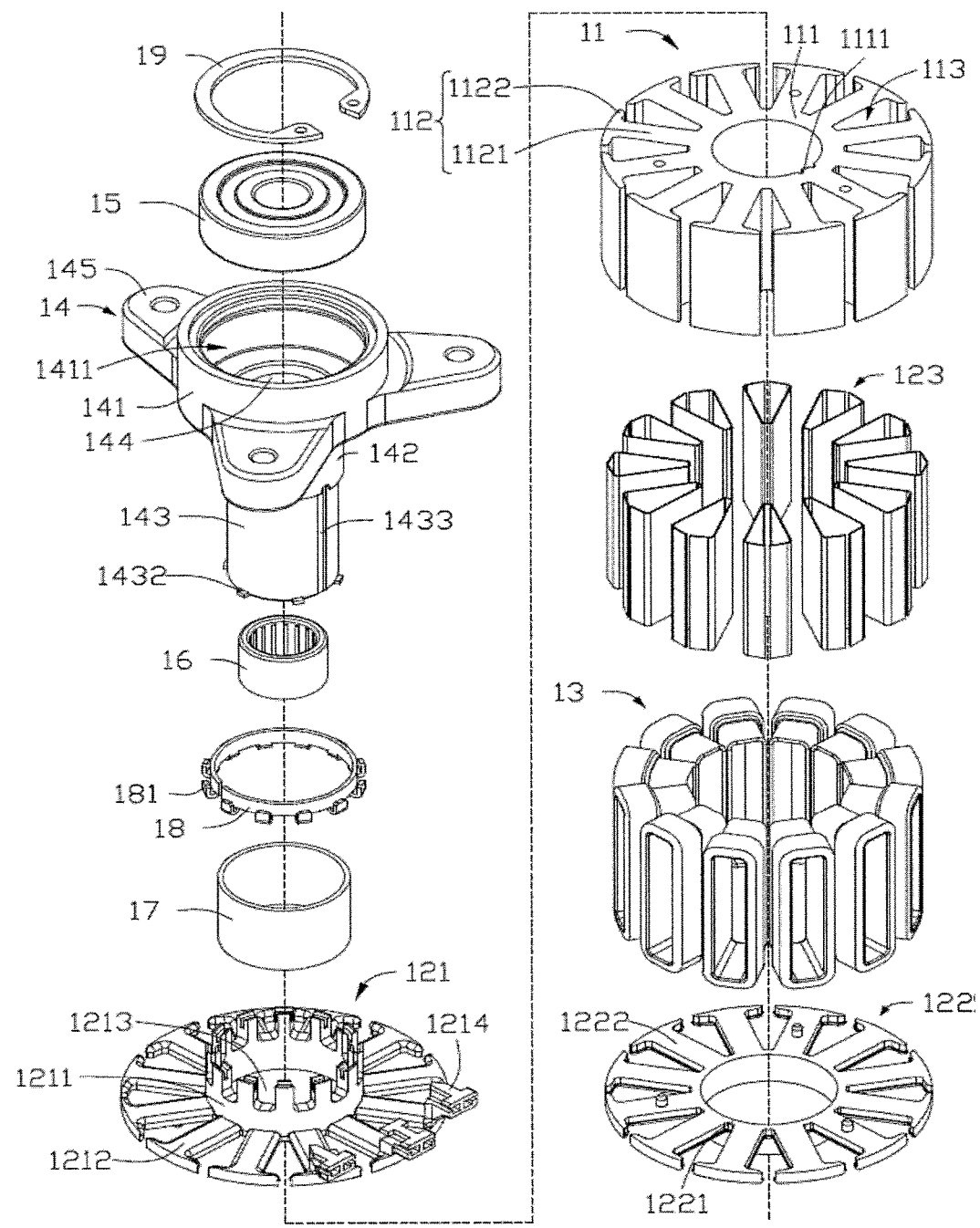
FIG. 3 is an exploded view of the stator shown in FIG. 2.

Referring also to FIG. 3, the stator 10 includes a stator core 11, a winding bracket 12, stator windings 13, and a fixing bracket 14.

The stator core 11 includes a stator yoke 111 and a plurality of stator teeth 112. The stator yoke 111 is of a hollow ring shape, and includes an inner wall surface provided with a positioning column 1111. The positioning column 1111 extends along an axial direction of the stator core 11. The stator teeth 112 are disposed on an outer circumferential surface of the stator yoke 111 at even intervals. Each of the stator teeth 112 includes a tooth portion 1121 and a magnetic pole 1122. The tooth portion 1121 is substantially of a rectangular shape, with an end thereof being connected to the outer circumferential surface of the stator yoke 111. The magnetic pole 1122 is substantially of an arc shape, and is connected to an end of the tooth portion 1121 away from the stator yoke 111. A receiving slot 113 is defined between adjacent two stator teeth 112. In this embodiment, the stator core 11 is exemplarily illustrated as including twelve stator teeth 112. The number of the stator teeth 112 is not limited and, in other embodiments, the number of the stator teeth 112 may be adjusted according to needs.

The winding bracket 12 includes an upper winding block 121, a lower winding block 122 and a plurality of winding sheets 123. The upper winding block 121, the lower winding block 122 and the plurality of winding sheets 123 are each made of an insulation material.

The upper winding block 121 includes an inner ring 1211 and a plurality of winding plates 1212. A plurality of U-shaped grooves 1213 is defined in an end of the inner ring 1211. The U-shaped grooves 1213 are arranged at even intervals. The winding plates 1212 are disposed at an outer surface of the inner ring 1211 at even intervals. The winding plates 1212 are disposed at an end of the inner ring 1211 away from the U-shaped grooves 1213. Each of the winding plates 1212 has the same shape as the stator teeth 112, and a number of the winding plates 1212 is equal to a number of the stator teeth 112. In this embodiment, a protruding block 1214 protrudes from an edge of each of three adjacent ones of the winding plates 1212. Each protruding block 1214 is used to connect with a terminal (not shown). The lower winding block 122 includes an inner ring 1221 and a plurality of winding plates 1222. The winding plates 1222 are disposed at an outer surface of the inner ring 1221 at even intervals. Each of the winding plates 1222 has the same shape as the stator teeth 112, and a number of the winding plates 1222 is equal to a number of the stator teeth 112. The winding sheets 123 each have a shape which is substantially the same as that of the receiving slot 113. Each of the winding sheets 123 forms a hollow structure. In installing the winding bracket 12 to the stator core 11, the lower winding block 122 may be first installed to a bottom end of the stator core 11, with each of the winding plates 1222 aligning with the corresponding stator tooth 112. Then, each of the winding sheets 123 is inserted into the corresponding receiving slot 113, and the upper winding block 121 is installed to a top end of the stator core 11, with each of the winding plates 1212 aligning with the corresponding stator tooth 112.

A number of the stator windings 13 is equal to a number the stator teeth 112. Each stator winding 13 is wound around the corresponding stator tooth 112 through the winding bracket 12.

Figure 7:
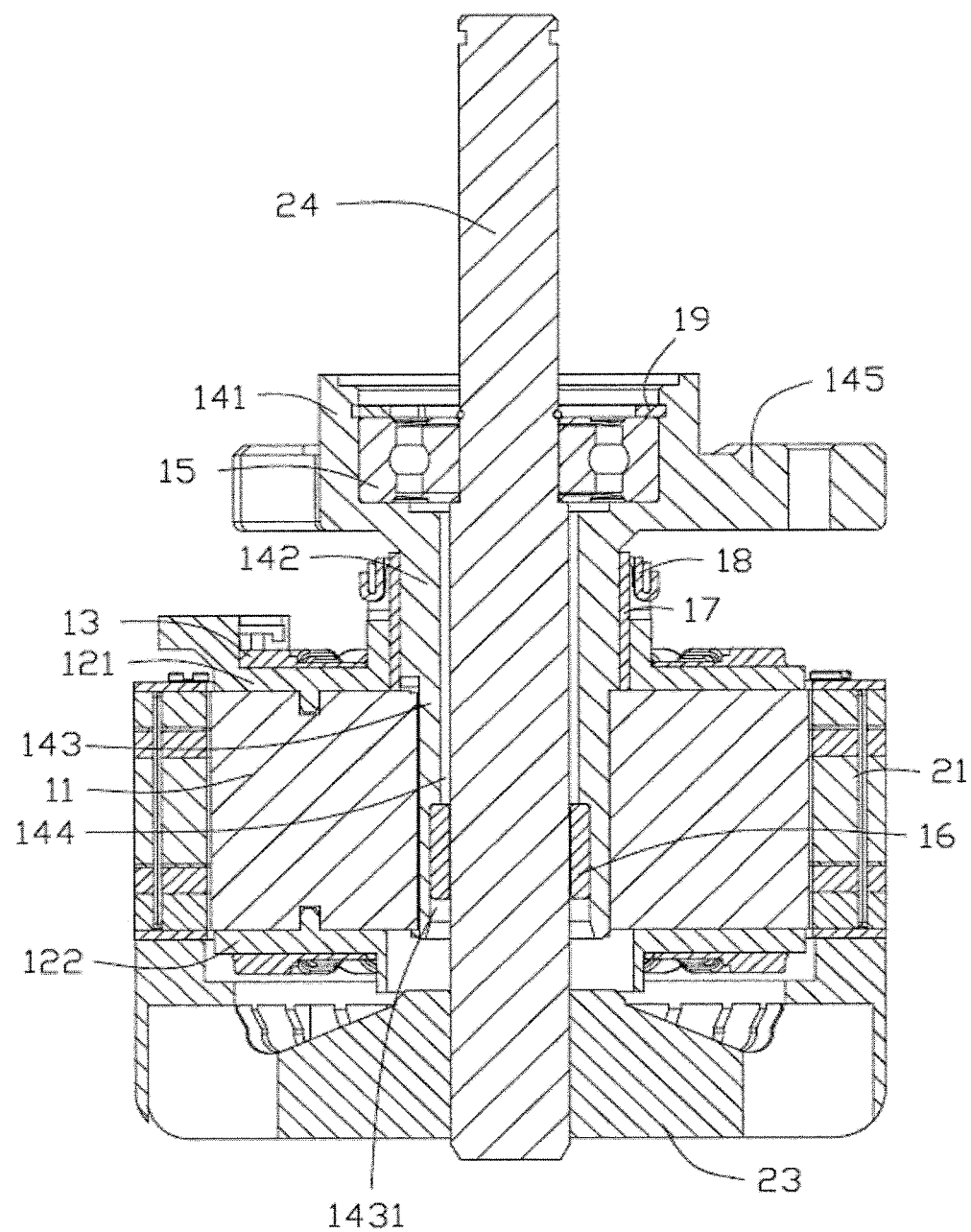
FIG. 7 is a sectional view of the motor of FIG. 1, taken along line VI-VI thereof.

The fixing bracket 14 is substantially hollow step-shaped, and includes a first accommodating tube 141, a second accommodating tube 142 and a third accommodating tube 143. The first accommodating tube 141, the second accommodating tube 142 and the third accommodating tube 143 are sequentially connected. An accommodating hole 144 extends through the first accommodating tube 141, the second accommodating tube 142 and the third accommodating tube 143 along an axial direction of the fixing bracket 14. An accommodating groove 1411 in communication with the accommodating hole 144 is defined in an end of the first accommodating tube 141 along the axial direction. The accommodating groove 1411 is used to accommodate a bearing 15. A plurality of lugs 145 protrudes from an outer surface of the first accommodating tube 141 along a radial direction of the fixing bracket 14. The lugs 145 are used to connect the fixing bracket 14 with an external component (not shown). In this embodiment, a number of the lugs 145 is three. Referring also to FIG. 7, an accommodating groove 1431 in communication with the accommodating hole 144 is defined in an end of the third accommodating tube 143 along the axial direction. The accommodating groove 1431 is used to accommodate another bearing 16. A plurality of protrusions 1432 protrudes from the end of the third accommodating tube 143 along the radial direction. The protrusions 1432 are arranged at even intervals. A positioning groove 1433 is defined in an outer surface of the third accommodating tube 143 along the axial direction, corresponding to the positioning column 1111. In installing the fixing bracket 14 to the stator core 11 and the winding bracket 12, the end of the third accommodating tube 143 may be sequentially extended through the upper winding block 121 and the stator core 11, with the second accommodating tube 142 abutting against an end of the stator core 11 adjacent the upper winding block 121, the plurality of protrusions 1432 abutting against an end of the stator core 11 away from the upper winding block 121, and an outer surface of the second accommodating tube 142 abutting against the inner ring 1211 of the upper winding block 121.

In this embodiment, a collar 17 is attached around the second accommodating tube 142. The collar 17 is located between the second accommodating tube 142 and the inner ring 1211 of the upper winding block 121. A connection ring 18 is further attached around an outer surface of the collar 17. The connection ring 18 has a plurality of connection hooks 181. The connection ring 18 is attached around the outer surface of the collar 17, and each connection hook 181 is received in one of the U-shaped grooves 1213.

In this embodiment, a snap ring 19 is installed in the first accommodating tube 141, for securing the bearing 15 received in the accommodating groove 1411.

Figure 4:
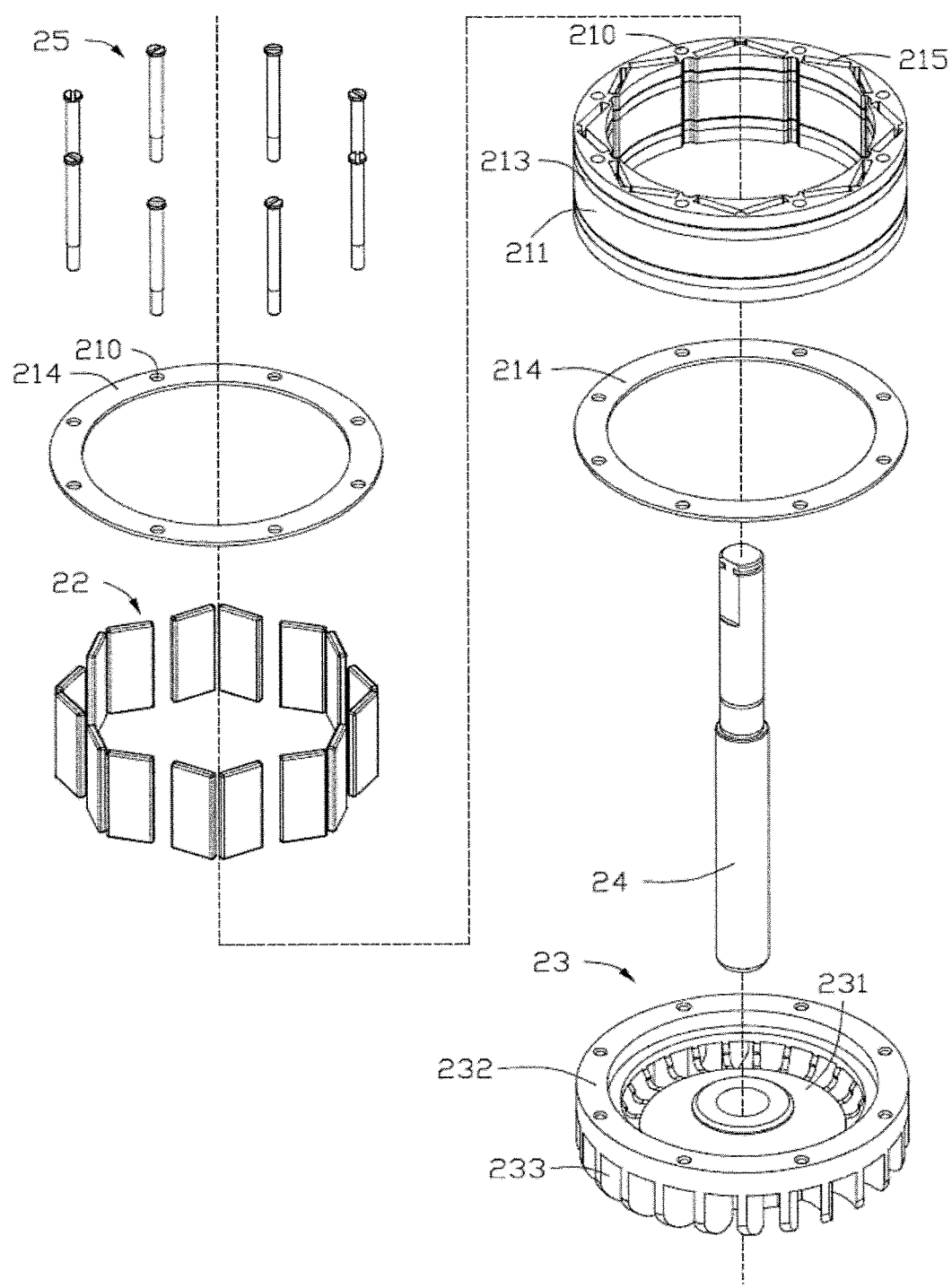
FIG. 4 is an exploded view of the rotor shown in FIG. 2.

Referring to FIG. 2 and FIG. 4, the rotor 20 includes a magnet yoke 21, a plurality of permanent magnets 22, an endcap 23, a rotary shaft 24 and a plurality of fixing pins 25.

Figure 5:
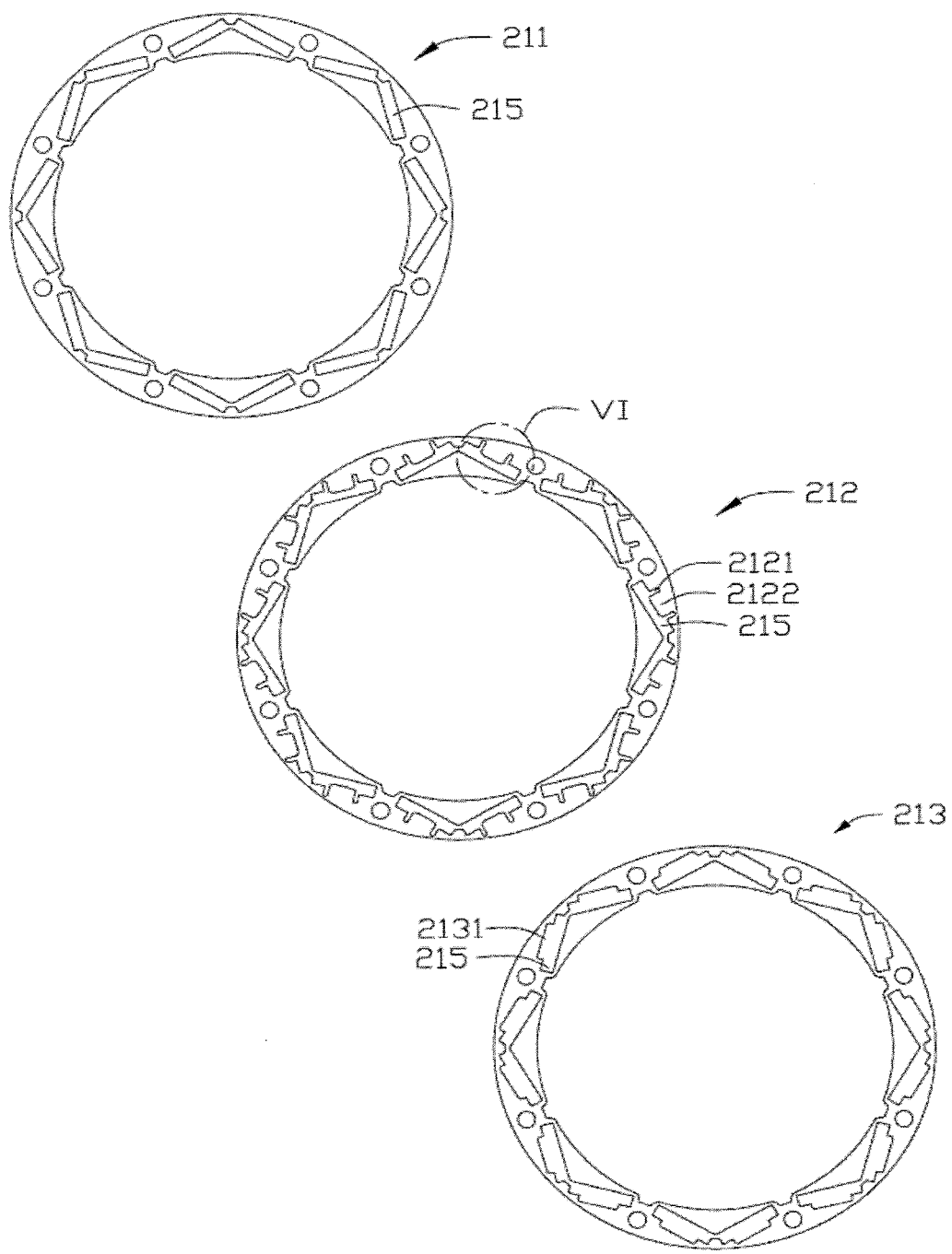
FIG. 5 is a sectional view of a first lamination layer, a second lamination layer and a third lamination layer shown in FIG. 4.
Figure 6:
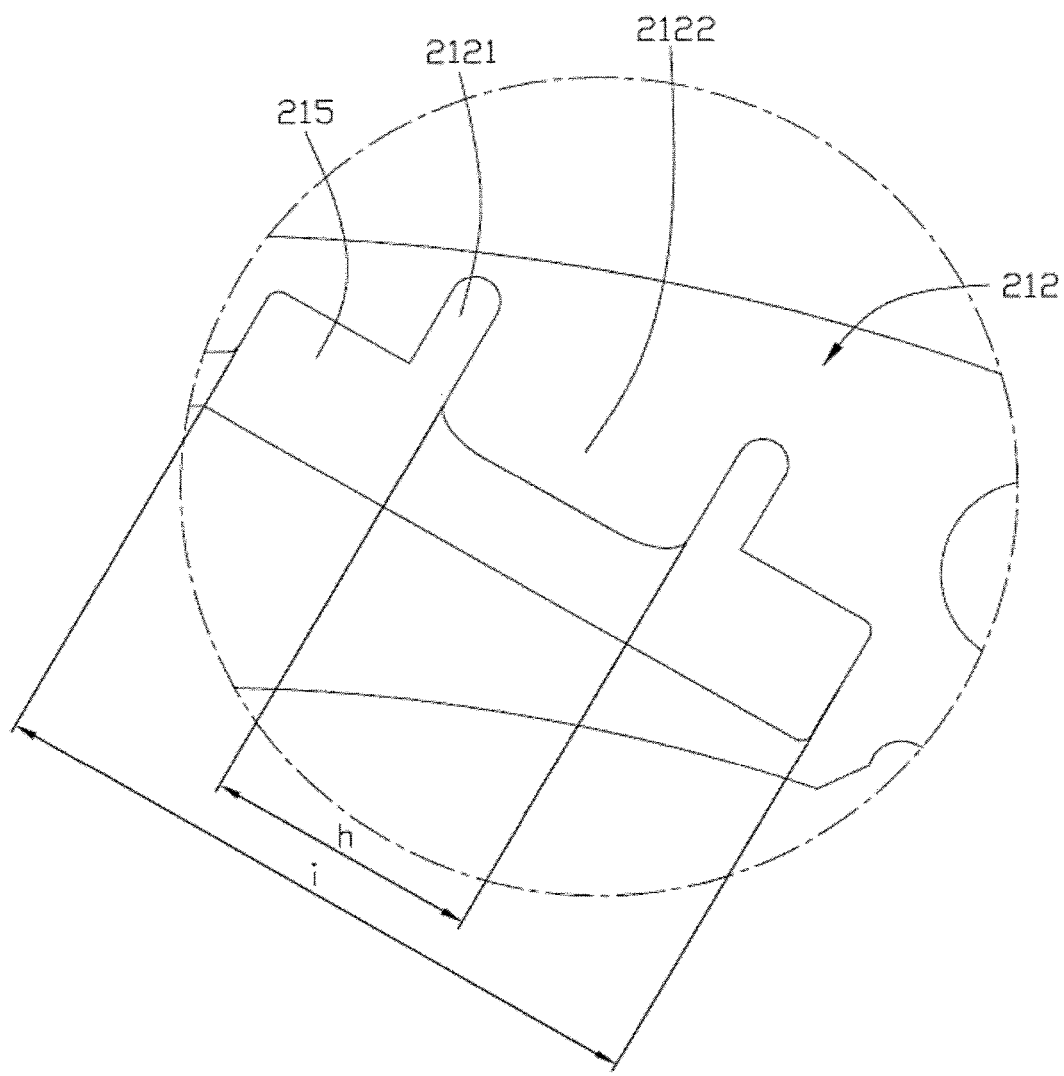
FIG. 6 is an enlarged view of a portion VI shown in FIG. 5.
Figure 8:
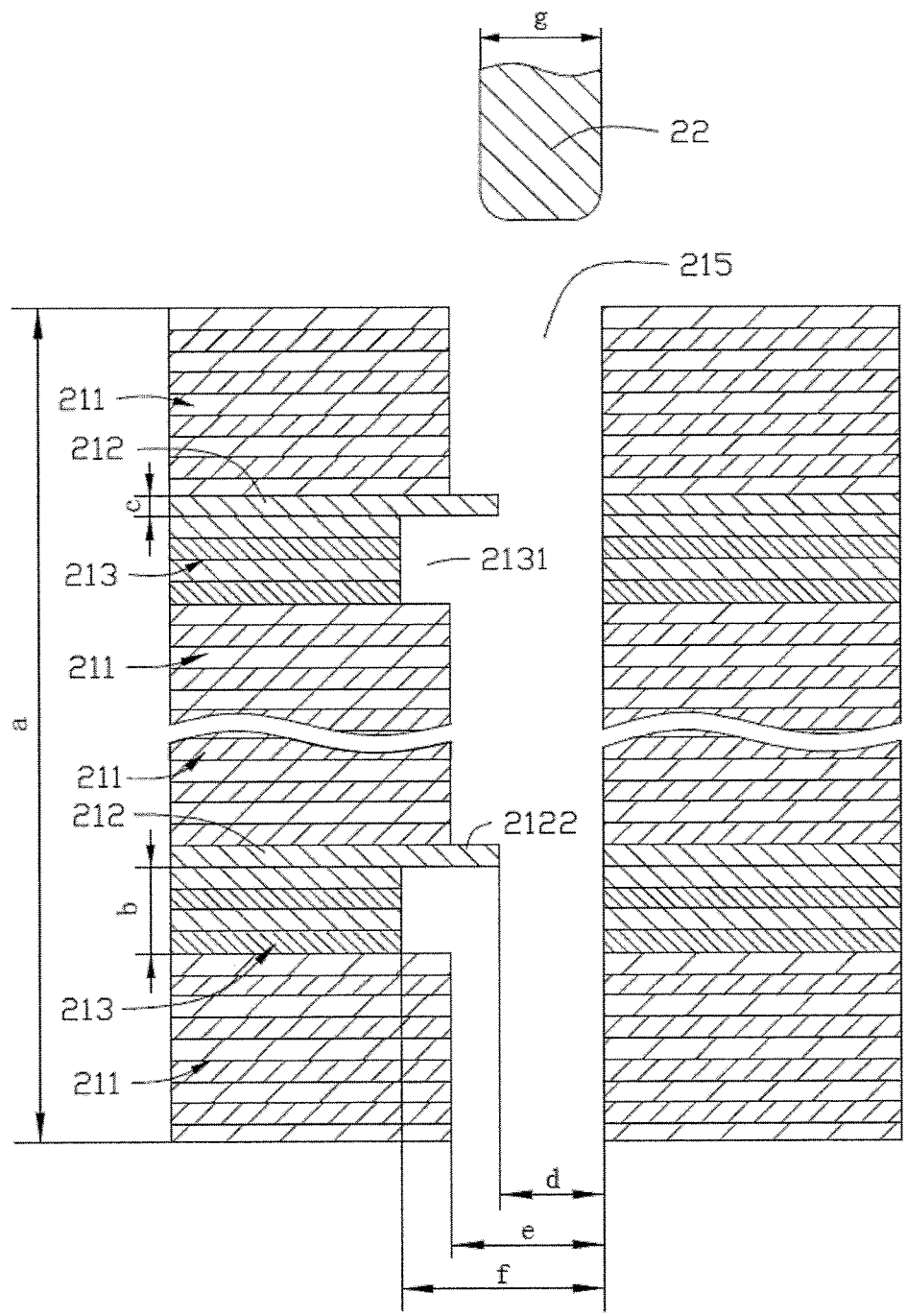
FIG. 8 is a partial, sectional view of the first lamination layer, the second lamination layer and the third lamination layer when stacked.

Referring also to FIG. 5, FIG. 6 and FIG. 8, the magnet yoke 21 is of a hollow cylindrical shape, and includes a plurality of annular first lamination layers 211, second lamination layers 212, third lamination layers 213 and fourth lamination layers 214. The first lamination layer 211, the second lamination layer 212, the third lamination layer 213 and the fourth lamination layer 214 are respectively fottned by stacking different numbers of silicon steel sheets or laminations of other soft magnetic material. Each of the silicon steel sheets or laminations of other soft magnetic material has the same thickness. A plurality of connection holes 210 is defined in each of the first lamination layer 211, the second lamination layer 212, the third lamination layer 213 and the fourth lamination layer 214. The fixing pins 25 are inserted into the corresponding connection holes 210 in the first lamination layer 211, the second lamination layer 212, the third lamination layer 213 and the fourth lamination layer 214 to form the magnet yoke 21. In this embodiment, the number of the first lamination layers 211 is three, and the number of each of the second lamination layers 212, the third lamination layers 213 and the fourth lamination layers 214 is two. One first lamination layer 211, one second lamination layer 212, one third lamination layer 213, one first lamination layer 211, one second lamination layer 212, one third lamination layer 213 and one first lamination layer 211 are sequentially stacked on each other between the two fourth lamination layers 214. In this embodiment, a thickness of the third lamination layer 213 is greater than a thickness of the second lamination layer 212.

A plurality of accommodating slots 215 are defined through the first lamination layer 211, the second lamination layer 212 and the third lamination layer 213 along an axial direction of the magnet yoke 21. Each accommodating slot 215 is substantially of a rectangular shape. In this embodiment, each two adjacent accommodating slots 215 are arranged in a V-shape opened towards a center of the magnet yoke 21. The two adjacent receiving slots 215 that are arranged in the V-shape are in communication with each other. A groove 2121 is defined in a surface of the second lamination layer 212, corresponding to each accommodating slot 215. The groove 2121 is located at an outer side of the corresponding accommodating slot 215 and is in communication with the corresponding accommodating slot 215. An elastic member 2122 protrudes towards the accommodating slot 215 from one side of the groove 2121 away from the accommodating slot 215. A distal end of the elastic member 2122 is disposed within the accommodating slot 215. A groove 2131 is defined in a surface of the third lamination layer 213, corresponding to each accommodating slot 215. The groove 2131 is located at an outer side of the corresponding accommodating slot 215 and is in communication with the corresponding accommodating slot 215. In this embodiment, a distance from the groove 2131 of the third lamination layer 213 to one side of the accommodating slot 215 away from the groove 2131 is greater than a width of the accommodating slot 215.

It should be understood, the magnet yoke 21 includes at least two second lamination layers 212, i.e. there are at least two elastic members 2122 in each accommodating slot 215, and the at least two elastic members 2122 are disposed in a middle portion of the accommodating slot 215 and spaced from each other.

The permanent magnet 22 is substantially in the form of a rectangular block. In this embodiment, a width of the accommodating slot 215 is greater than a width of the permanent magnet 22. Each permanent magnet 22 is inserted in one corresponding accommodating slot 215, and abuts against the distal ends of the corresponding elastic members 2122, causing the corresponding elastic members 2122 to bend towards the grooves 2131 of the third lamination layers 213. The permanent magnet 22 is fixed in the accommodating slot 215 by the elastic force of the elastic members 2122, and one side of the permanent magnet 22 away from the elastic members 2122 abuts against a side surface of the accommodating slot 215. The fourth lamination layers 213 are located at two ends of the magnet yoke 21, for sealing the permanent magnet 22 in the accommodating slot 215. In this embodiment, the elastic member 2122 is in line contact with the permanent magnet 22, that is, in a radial section of the rotor 20, the elastic member 2122 is in line contact with the permanent magnet 22.

In this embodiment, each permanent magnet 22 is polarized along its thickness direction, each permanent magnet 22 foiins one corresponding magnetic pole, and polarities of adjacent permanent magnets 22 are opposite to each other. Specifically, the permanent magnets 22 are distributed along a circumferential direction of the magnet yoke 21, and the polarities of inner surfaces of the permanent magnets 22 include N-poles and S-poles that are alternately arranged along the circumferential direction of the magnet yoke 21, thereby forming alternately-arranged N-poles and S-poles at an inner circumferential surface of the magnet yoke 21.

Referring to FIG. 8, a width of the accommodating slot 215 is greater than a width of the permanent magnet 22, and a distance from the groove 2131 of the third lamination layer 213 to the side of the accommodating slot 215 away from the groove 2131 is greater than a width of the accommodating slot 215. A thickness of the third lamination layer 213 is greater than a thickness of the second lamination layer 212. In this embodiment, a stacked thickness of the plurality of the first lamination layers 211, the second lamination layers 212, the third lamination layers 213 and the fourth lamination layers 214 is represented by letter "a", which is 25 mm. A thickness of each of the two third lamination layers 213 is represented by letter "b", which is 1.4 mm. A thickness of each of the two second lamination layers 212 is represented by letter "c", which is 0.35 mm. A distance from the elastic member 2122 of the second lamination layer 212 to one side of the accommodating slot 215 away from the elastic member 2122 is represented by letter "d", which is in the range of 1.55 mm to 1.62 mm. The width of the accommodating slot 215 is represented by letter "e", which is in the range of 2.02 mm to 2.07 mm. A distance from the groove 2131 of the third lamination layer 213 to one side of the accommodating slot 215 away from the groove 2131 is represented by letter "f", which is in the range of 2.87 mm to 2.97 mm. The width of the permanent magnet 22 is represented by letter "g", which is in the range of 1.9 mm to 2.0 mm.

Referring also to FIG. 6, the elastic member 2122 has a width h which is 30% to 80% of a length i of the accommodating slot 215.

Figure 9:
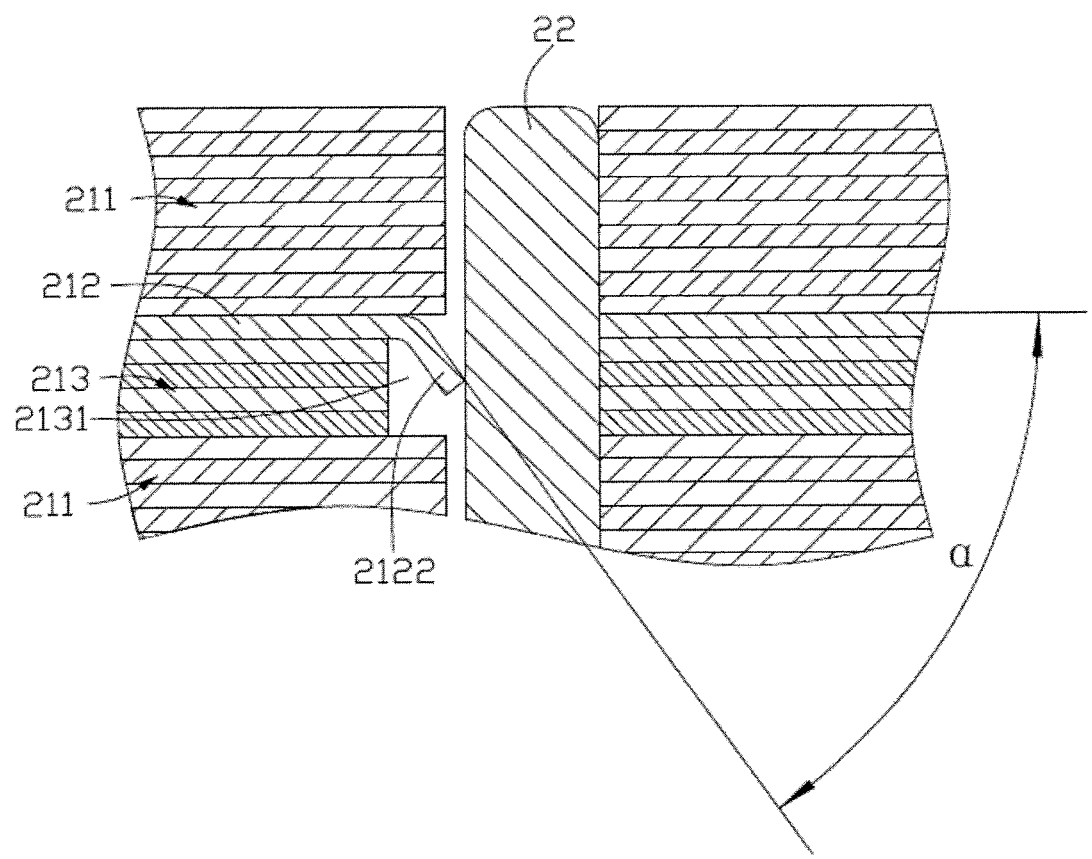
FIG. 9 is a schematic diagram showing that an elastic member is bent at a minimum angle when a permanent magnet is inserted into an accommodating slot shown in FIG. 8.

Referring also to FIG. 9, the width g of the permanent magnet 22 is 1.9 mm, the distance d from the elastic member 2122 of the second lamination layer 212 to one side of the accommodating slot 215 away from the elastic member 2122 is 1.62 mm, the distance f from the groove 2131 of the third lamination layer 213 to one side of the accommodating slot 215 away from the groove 2131 is 2.97 mm. In this case, when the permanent magnet 22 is inserted into the accommodating slot 215, the elastic member 2122 is bent towards the groove 2131 of the third lamination layer 213 at a minimum angle α which is 55°.

Figure 10:
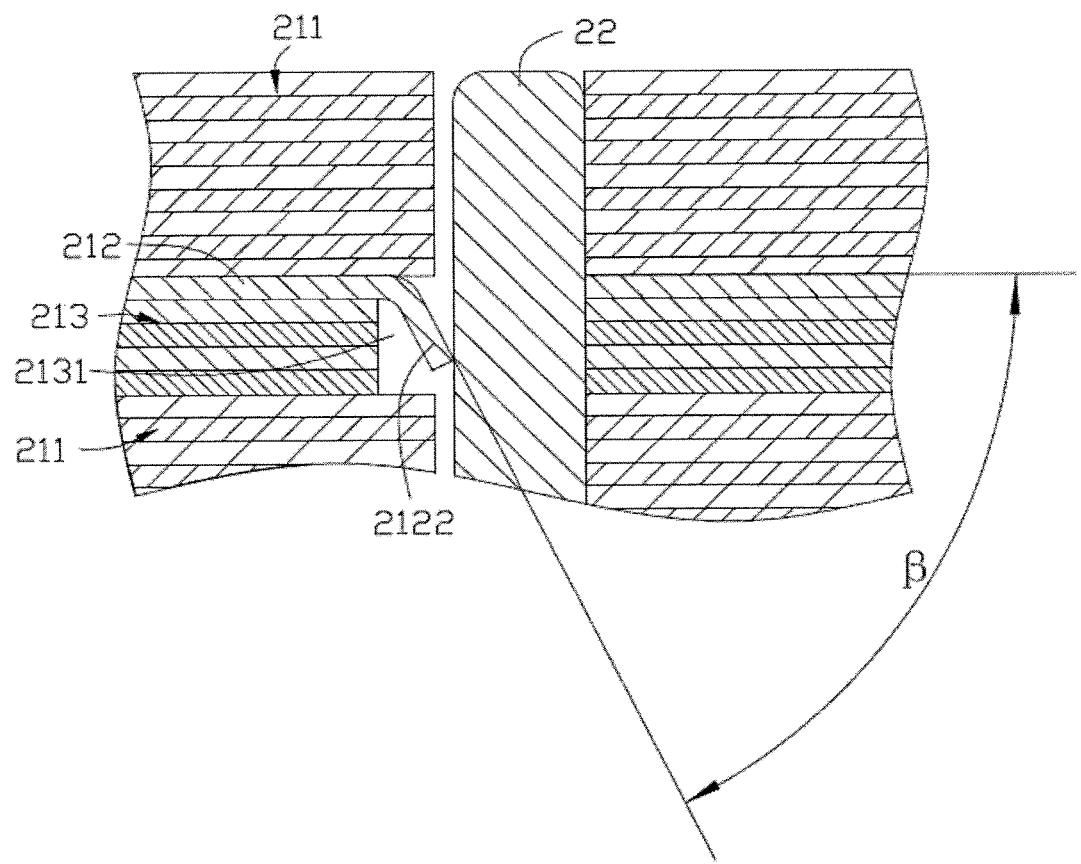
FIG. 10 is a schematic diagram showing that the elastic member is bent at a maximum angle when the permanent magnet is inserted into the accommodating slot shown in FIG. 8.

Referring to FIG. 10, the width g of the permanent magnet 22 is 2.0 mm, the distance d from the elastic member 2122 of the second lamination layer 212 to one side of the accommodating slot 215 away from the elastic member 2122 is 1.55 mm, the distance f from the groove 2131 of the third lamination layer 213 to one side of the accommodating slot 215 away from the groove 2131 is 2.87 mm. In this case, when the permanent magnet 22 is inserted into the accommodating slot 215, the elastic member 2122 is bent towards the groove 2131 of the third lamination layer 213 at a maximum angle β which is 65°.

Referring to FIG. 4, the endcap 23 has a bottom wall 231 and a sidewall 232. A plurality of ventilation slots 233 is radially defined in a junction between the bottom wall 231 and the sidewall 232. One end of each of the plurality of fixing pins 25 extends sequentially through the magnet yoke 21 and the sidewall 232 of the endcap 23, so as to fix the endcap 23 to the magnet yoke 21.

Referring to FIG. 7, one end of the rotary shaft 24 is connected to the bottom wall of the endcap 23, and the other end of the rotary shaft 24 extends through the accommodating hole 144 of the fixing bracket 14 as well as the bearings 15 and 16. The stator core 11 with the stator windings 13 wound thereon is received in the magnet yoke 21.

In the rotor 20 of one embodiment of the present disclosure, each permanent magnet 22 is inserted into one corresponding accommodating slot 215 and abuts against the corresponding elastic members 2122 of the second lamination layers 212, causing the corresponding elastic members 2122 to bend towards the grooves 2131 of the third lamination layers 213. As a result, the permanent magnet 22 is fixed in the accommodating slot 215 by the elastic force of the elastic members 2122 without using adhesive to fix the permanent magnet 22 relative to the magnet yoke 21, thereby facilitating manufacturing of the rotor 20 and improving manufacturing efficiency of the motor 100.

It should be understood that, the number of the first lamination layers 211, the number of the second lamination layers 212 and the number of the third lamination layers 213 are not limited to those particular values described in the above embodiment, and specific numbers of the various lamination layers may be set according to different requirements.

It should be understood that, the structure of the magnet yoke 21 is not limited to the particular structure in the above embodiment. For example, the third lamination layers 213 may be omitted, in which case the permanent magnet 22 can still be fixed in the accommodating slot 215 by the elastic force of the elastic members 2122.

Figure 11:
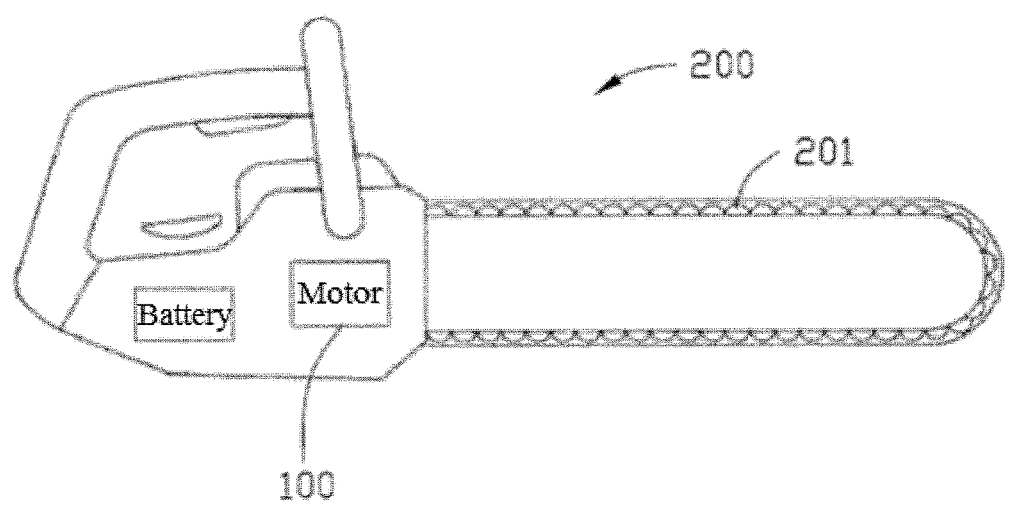
FIG. 11 illustrates an electric saw of the present disclosure.

Referring to FIG. 11, the motor 100 of this embodiment can be used in an electric saw 200. The electric saw 200 includes a saw blade 201. The motor 100 is used to drive the saw blade 201. It should be understood that the motor 100 can also be used in other power tools.

The above embodiments are merely to illustrate the technical solutions of the present disclosure and are not intended to limit the present disclosure. Although the present disclosure has been described with reference to the above preferred embodiments, it should be appreciated by those skilled in the art that various modifications and variations may be made without departing from the spirit and scope of the present disclosure.

The invention claimed is:

1. A rotor comprising:
   a magnet yoke defining a plurality of accommodating slots therein;
   an elastic member protruding from the magnet yoke towards each of the accommodating slots; and
   a plurality of permanent magnets each inserted in one of the accommodating slots, and the elastic member bent and abutting against each of the plurality of permanent magnets.

2. The rotor of claim 1, wherein one side of each of the permanent magnets abuts against the elastic member, and the other side of each of the permanent magnets is in contact with a side surface of the accommodating slot.

3. The rotor of claim 1, wherein each of the permanent magnets is in line contact with the elastic member.

4. The rotor of claim 1, wherein at least two elastic members are disposed in each of the accommodating slots, and the at least two elastic members are disposed in a middle portion of the magnet yoke and spaced from each other.

5. The rotor of claim 1, wherein the magnet yoke comprises a first lamination layer, a second lamination layer and a third lamination layer, the second lamination layer is located between the first lamination layer and the third lamination layer, the accommodating slots extend through the first lamination layer, the second lamination layer and the third lamination layer, a groove is defined through each of the second lamination layer and the third lamination layer at one side of each of the accommodating slots, the grooves in the second lamination layer and the third lamination layer are located at same sides of the corresponding accommodating slots, the elastic members protrude from the grooves of the second lamination layer towards the accommodating slots.

6. The rotor of claim 5, wherein the elastic member protrudes towards accommodating slot from one side of the groove of the second lamination layer, and a distal end of the elastic member bend toward the groove of the third lamination layers.

7. The rotor of claim 5, wherein a width of each of the elastic members is 30% to 80% of a length of each of the accommodating slots.

8. The rotor of claim 5, wherein a width of each of the accommodating slots is greater than a width of each of the permanent magnets, and a thickness of the third lamination layer is greater than a thickness of the second lamination layer.

9. The rotor of claim 5, wherein the magnet yoke further comprises two fourth lamination layers, the two fourth lamination layers are located at two opposite ends of the magnet yoke for sealing the permanent magnets in the accommodating slots.

10. The rotor of claim 5, wherein the rotor further comprises a plurality of fixing pins, and the first lamination layer, the second lamination layer and the third lamination layer are fixed together by the fixing pins.

11. The rotor of claim 10, wherein the rotor further comprises an endcap, the endcap has a bottom wall and a sidewall, and the sidewall of the endcap is fixed on the magnet yoke by the fixing pins.

12. The rotor of claim 1, wherein each two adjacent accommodating slots are arranged in a V-shape opened towards a center of the magnet yoke, and the each two adjacent accommodating slots that are arranged in the V-shape are in communication with each other.

13. A motor comprising:
a rotor of claim 1; and
a stator comprising a stator core and a plurality of stator windings wound around the stator core, the stator core being received in the magnet yoke.

14. The motor of claim 13, wherein the motor is an outer-rotor permanent magnet motor.

15. The motor of claim 13, wherein one side of each of the permanent magnets abuts against the elastic member, and the other side of each of the permanent magnets is in contact with a side surface of the accommodating slot.

16. The motor of claim 13, wherein each two adjacent accommodating slots are arranged in a V-shape opened towards a center of the magnet yoke, and the each two adjacent accommodating slots that are arranged in the V-shape are in communication with each other.

17. The motor of claim 13, wherein the magnet yoke comprises a first lamination layer, a second lamination layer and a third lamination layer, the second lamination layer is located between the first lamination layer and the third lamination layer, the accommodating slots extend through the first lamination layer, the second lamination layer and the third lamination layer, a groove is defined through each of the second lamination layer and the third lamination layer at one side of each of the accommodating slots, the grooves in the second lamination layer and the third lamination layer are located at same sides of the corresponding accommodating slots, the elastic members protrude from the grooves of the second lamination layer towards the accommodating slots.

18. The motor of claim 17, wherein the elastic member protrudes towards accommodating slot from one side of the groove of the second lamination layer, and a distal end of the elastic member bend toward the groove of the third lamination layers.

19. A power tool comprising a permanent magnet motor, the permanent magnet motor comprising:
a rotor of claim 1; and
a stator comprising a stator core and a plurality of stator windings wound around the stator core, the stator core being received in the magnet yoke.

20. The power tool of claim 19, wherein the power tool is an electric saw which comprises a saw blade, and the motor is configured to drive the saw blade.

* * * * *